3,657,225
2,3-EPITHIO-5α-ANDROST-6-ENE COMPOUNDS
Taichiro Komeno, Osaka-shi, Japan, assignor to
  Shionogi & Co., Ltd., Osaka, Japan
No Drawing. Continuation-in-part of application Ser. No.
  769,412, Oct. 21, 1968. This application Dec. 24, 1969,
  Ser. No. 888,031
Claims priority, application Japan, Oct. 25, 1967,
  42/68,682
          Int. Cl. C07c 173/00
U.S. Cl. 260—239.5                               20 Claims

ABSTRACT OF THE DISCLOSURE

2α,3α-epithio-17 - oxygenated - 5α - androst-6-ene compounds of the formula

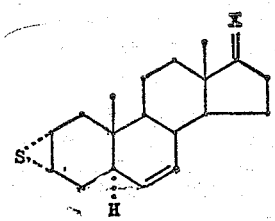

wherein X is an oxo group or a

OR
 /
 \
  R' group, in which R is a hydrogen atom or an optionally substituted lower hydrocarbon-carbonyl group or a substituted or unsubstituted cyclo-lower hydrocarbon group or tetrahydropyranyl group or tetrahydrofuranyl group; R' is a hydrogen atom or a lower hydrocarbon group, having strong antiestrogenic activity accompanied with least side effects, pharmaceutical preparations containing one or more of them and process for preparation of these compounds.

---

This application is a continuation-in-part application of copending application Ser. No. 769,412 filed Oct. 21, 1968, which is now abandoned.

The present invention relates to a new group of 2,3-epithio - 5α - androstene compounds. More specifically, it relates to a 2α,3α-epithio-5α-androst-6-en-17β-ol and its derivatives.

The compounds of the present invention are represented by the general formula:

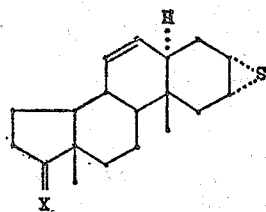

wherein X is an oxo group or a

OR
 /
 \
  R' group, in which R is a hydrogen atom or an optionally substituted lower hydrocarbon-carboxylic acyl group or a substituted or unsubstituted cyclo-lower hydrocarbon group or tetrahydropyranyl group or tetrahydrofuranyl group; R' is a hydrogen atom or a lower hydrocarbon group.

The parent compounds lacking a double bond at position 6, namely 2α,3α - epithio-5α-androstane compounds have been utilized as most potential anabolic and antiestrogenic agent. However, they still possessed about a half of androgenic activity of testosterone. Therefore, when the compounds are administered to a female, or when the androgenic effect is undesirable, side effects such as virilism, etc., were serious problems to be solved for clinical use. In contrast, the compounds of the present invention have stronger antiestrogenic activity and related activities in contrast to one-twentieth myogenic and one-tenth androgenic activities than the parent compounds, and are the best antiestrogenic substances of the hitherto developed compounds. This feature is of the greatest importance in actual application, and the compounds of the present invention almost completely solved the difficult problem. Thus the compounds of the present invention are the best known medicines for treatment of diseases demanding antiestrogenic agent, with least side effects.

The compounds of the present invention are 2α, 3α-epithio-5α-androst-6-en-17β-ol and its modifications at position 17. The substituent at position 17α represented by R' may be a hydrogen atom or a lower hydrocarbon group. Such a hydrocarbon group involves methyl, ethyl, propyl, isobutyl, vinyl, ethynyl, propinyl group and the like containing up to four carbon atoms. The hydroxyl group at position 17β may be acylated or etherized. The acylates or ethers represented by RO may be substituted or unsubstituted aliphatic acylates for example alkanoates e.g. formate, acetate, propionate, enanthate, octanoate, decanoate, trimethylacetate, tert-butylacetate, cycloalkylalkanoates, adamantoate, haloacetate, crotonate, succinate, glutamate, camphorate, phenylpropionate, and the like, or aromatic acylates for example substituted or unsubstituted benzoate, e.g. sulfobenzoate, furoate, nicotinate, phthalate, substituted or unsubstituted phenoxyacetates, etc., or ethers for example substituted or unsubstituted tetrahydropyranyl ether, tetrahydrofuranyl ether, 1-cycloalkenyl ether, 1-alkoxycycloalkyl ether and the like.

Typical examples of the compounds of the present invention include:

2α,3α-epithio-5α-androst-6-en-17-one,
2α,3α-epithio-5α-androst-6-en-17β-ol,
2α,3α-epithio-5α-androst-6-en-17β-ol lower alkanoate, e.g. acetate, propionate, enanthate, octanoate, decanoate, etc., 2α,3α-epithio-5α-androst-6-en-17β-ol phenylpropionate,
2α,3α-epithio-5α-androst-6-en-17β-ol benzoate,
2α,3α-epithio-17α-methyl-5α-androst-6-en-17β-ol,
2α,3α-epitho-17α-ethyl-5α-androst-6-en-17β-ol,
2α,3α-epithio-17α-ethynyl-5α-androst-6-en-17β-ol,
2α,3α-epithio-5α-androst-6-en-17β-ol tetrahydropyranyl ether,
2α,3α-epithio-17β-(1-lower alkoxycycloalkyl)oxy-5α-androst-6-ene e.g.
2α,3α-epithio-17β-(1-methoxyclopentyl)oxy-5α-androst 6-ene,
and the like.

The starting materials of the present invention may be prepared from the known compounds by various methods. For example, 3,17-diacetyloxyandrost-5-ene is oxidized with chromium trioxide to obtain 7-oxoandrost-5-ene compound, which is hydrogenated, brominated at position 6, reduced at the ketone group at position 7 to afford bromohydrin and then dehydroxybrominated to introduce a double bond at position 6 and then oxidized at 3β-hydroxyl group to obtain 3-oxo-5α-androst-6-en-17β-ol.

The novel compound thus obtained is halogenated at position 2 with a halogenating agent avoiding halogenation of the double bond at position 6, treated with a reducing agent to obtain novel 3β-hydroxy-2α-halo-5α-androst-6-ene compound, and finally treated with a basic compound to obtain novel 2β,3β-epoxy-17-oxygenated-5α-androst-6-ene compounds, the starting material of the present invention. If required, modification at position 17 may be effected by e.g. oxidation of 17-hydroxyl group to 17-oxo group followed by reaction with an organometallic compound to give 17α hydrocarbon substituted derivatives, or esterification or etherification at 17-hydroxyl group to obtain 17-ester or 17-ether.

The process of the present invention comprises from following two steps.

In the first step of the present invention, the compounds of the formula:

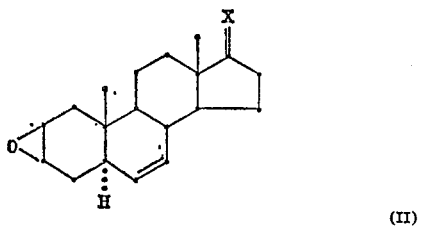

(II)

wherein X represents the same significances as defined above, are reacted with an active sulfur containing compound such as thiocyanic acid, thioalkanoic acid e.g. thioacetic acid thiopropionic acid, etc., to obtain 3α-sulfur substituted-2β-oxygenated-5α-androst-6-ene compounds and 2α-sulfur substituted-3β-oxygenated-5α-androst-6-ene compounds of the formula:

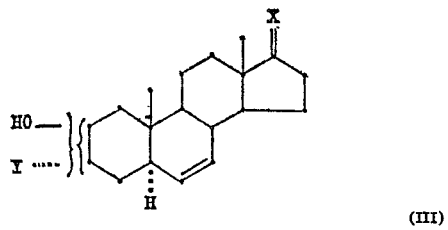

(III)

wherein X represents the same significances as defined above; Y represents a group containing active sulfur atom which may be converted into epithio group when treated with a base. As for a sulfur containing group represented by Y, there is exemplified thiocyanate groups, alkanoylthio group, alkoxycarbonylthio group, aryloxythiocarbonylthio group, alkoxythiocarbonylthio group, arylformimidoylthio group, amidinothio group and the like. A part of these compounds may also be prepared from 2α-halo-3-oxo-5α-androst-6-ene compounds by substitution of the halogen atom at position 2 with a sulfur containing agent such as alkalimetal ethyl xanthate, etc., followed by reduction of 3-oxo group to 3β-hydroxyl group. In this case, substitution reaction may be carried out in the presence of an appropriate solvent or a catalyst such as sodium ethoxide, sodium hydroxide, etc., and reduction of 3-oxo group may be effected with metal hydrides e.g. sodium borohydride, lithium borohydride, lithium trialkylaluminum hydrides, etc. The compounds of the formula III showed antiestrogenic and anabolic activities.

In the second step of the present invention, the compounds of the Formula III are treated under basic condition to afford the objective compounds of the present invention, namely, 2α,3α-epithio-17-oxygenated-5α-androst-6-ene compounds of the Formula I. Treatment under basic condition may be effected by contact of the compounds of the Formula III with an organic or inorganic base ranging from strong base to weak base, for example alkalimetal hydroxides e.g. sodium hydroxide, potassium hydroxide, etc., alkalimetal alkoxides, alkaline earth hydroxides e.g. calcium hydroxide, barium hydroxide, etc., alkalimetal hydrides e.g. lithium aluminum hydride, sodium borohydride, etc., alkalimetal carbonates e.g. sodium carbonate, potassium bicarbonate, etc., alumina, pyridine, tetraalkylammonium hydroxides, etc. These agents may be used in a solvent such as methanol ethanol, ether, tetrahydrofuran, dioxane, benzene, toluene, chloroform, etc. Prior to the reaction of this step, the alcohol group at position 2 or 3 of the compounds III may be substituted with a halogen atom, alkanoylated or more preferably sulfonylated with a lower alkylsulfonylating agent e.g. methanesulfonyl halide, ethanesulfonyl halide, propanesulfonyl halide, etc., or aromatic sulfonylating agent e.g. benzenesulfonyl halide, toluenesulfonyl halide, p-bromobenzenesulfonyl halide, etc., to facilitate formation of the epithio group.

In every step cited above, the products may be isolated by a conventional method such as decomposition of the reagent, precipitation with an insoluble solvent, filtration, dilution, extraction with a solvent immiscible with water, washing, drying, evaporation of solvent, absorption and elution, etc., or combination or these methods. The isolated products may be purified by a conventional method such as chromatography, recrystallization, absorption with absorbent, etc., or combination of these methods. If desirable, isolated products may be used as the starting material of the next step without further purification. If desired, the products of every step may be transformed into other compounds having X as defined above. For instance, they may be oxidized to 17-oxo compound followed by reaction with an organometallic compound to introduce the corresponding 17α-hydrocarbon group, or esterified with an appropriate acylating agent e.g. acid anhydrides, acid halides, etc., or etherized with an appropriate etherizing agent e.g. dihydropyran, dihydrofuran, 1,1-dialkoxycycloalkanes, 1-alkoxycycloalkenes, etc., for convenience of reaction of the next step or utilization of the product.

The compounds of the present invention represented by the general Formula I have valuable pharmacological activities. For example, they are useful agents for regulation of physiological functions as evidenced by their antiestrogenic activity, myogenic activity, androgenic activity, uterotropic activity or antiuterotropic activity, antimammary growth activity, implantation delay and related activities. They are characterized by increase in the ratio of the major activities, namely antiestrogenic activity to myogenic and androgenic activities. For example, oral administration of 0.5 mg. of 2α,3α-epithio-5α-androst-6-en-17β-ol 17-acetate or subcutaneous administration of 0.3 mg. of 2α,3α-epithio-5α-androst-6-en-17β-ol per a mouse inhibited 48% or 56% of effect of simultaneously administered estradiol when estimated on vaginal TTC reduction. Subcutaneous injection of 10 mg. 2α,3α-epithio-5α-androst-6-en-17β-ol per a rat showed about the same increase in weight of seminal vesicle and about a half of the increase in weight of levator ani muscle when compared with that of 1 mg. testosterone propionate. These values show that the compounds of the present invention have stronger antiestrogenic activity than 2α,3α-epithio-5α-androstane compounds in spite of one twentieth myogenic activity and one tenth androgenic activity. Thus the compounds of the present invention are the excellent medicines for treatment of dieases demanding antiestrogenic agents with least side effects for human and veterinary medicaments or additives to baits in a manner per se conventional in the art at a dose of 1γ to 100 mg. per kilogram of body weight for a day.

The compounds may be utilized in a wide variety of oral or parenteral dosage forms, solely or in admixture with other co-acting substances. They may be administered with a pharmaceutical carrier which can be a solid material or a liquid material in which the compound is dissolved, dispersed or suspended. The solid compositions can take the form of tablets, powders, granules, capsules, pills or the like. The liquid composition may take the form of injections, ointments, dispersions, suspensions, solutions, emulsions, syrups or elixirs. They may be flavoured, colored, and tables and granules may be coated. All of the diluents e.g. starch, sucrose, lactose, calcium carbonate, kaolin, etc., coloring agents, aromatic substances, flavouring substances, bulking agents, e.g. lactose, salt, glycine, starch, calcium carbonate, kaolin, bentonite, calcium phosphate, etc., binders e.g. starch, acacia, gelatin, glucose, sodium alginate, tragacanth, carboxymethylcellulose, etc., disintegrators e.g. starch, agar, carbonates, etc., lubricants e.g. stearic acid, talc, paraffin, boric acid, sodium benzoate, carbowax, cacao oil, etc., ointment bases e.g. fats, oils, lard, wool fat, vaselin, glycerin, resins, glycols, emulsifying agents, etc., solvents e.g. water, polyethyleneglycol, olive oil, peanut oil, sesame oil, cacao oil, methyl or ethyl oleate, etc., solubilizing agent, buffers and stabilizing agents, may be used if the agents do not exert wrong effect on the compounds.

The following examples are given by way of illustration only and are not intended as limitations of the present invention, many apparent variations of which are possible without departing from the spirit and scope thereof. The abbreviations have the conventionl meanings.

EXAMPLE 1

(1) Preparation of 3α-thiocyanato-5α-androst-6-ene-2β,17β-diol and 3-α-thiocyanato-17α-methyl-5α-androst-6-ene-2β,17β-diol A solution of 547 mg. of 2β,3β-epoxy-5α-androst-6-en-17β-ol in 10 ml. methylene chloride is mixed with a solution of thiocyanic acid in ether prepared from 3 g. of potassium thiocyanate, 5 g. of phosphoric acid and 20 ml. of ether, and kept at room temperature overnight. The reaction mixture is extracted with methylene chloride. The extract solution is washed with 10% aqueous solution of sodium carbonate and water, dried over anhydrous sodium sulfate and evaporated under reduced pressure. Recrystallization of the residue from a mixture of methylene chloride and methanol gives 538 mg. of crystals of M.P. 202–204° C. Yield: 81.7%. $[\alpha]_D^{24}$ —50.1±1.0° (c.=0.942, chloroform).

IR: $\nu_{max.}^{Nujol}$ 3500, 3397, 3230, 3008, 2155, 1050, 1023, 757 cm.$^{-1}$ Analysis.—Calcd. for $C_{20}H_{29}O_2NS1/3H_2O$ (percent): C, 68.01; H, 8.37; N, 3.97; S, 9.08. Found (percent): C, 67.94; H, 8.56; N, 3.83; S, 9.02.

In a similar manner, 2β,3β-epoxy-17α - methyl - 5α-androst-6-en-17β-ol is treated with thiocyanic acid to afford 3α-thiocyanato-17α-methyl-5α-androst-6-ene-2β,17β-diol, M.P. 202.5–203.5° C.

The starting material, 2β,3β-epoxy-5α-androst-6-en-17β-ol and 2β,3β-epoxy-17α-methyl-5α-androst-6-en-17β-ol are prepared from 17β-acetyloxy-5α-androst-6-en-3-one by bromination with 1.1 mole equivalents of phenyltrimethylammonium perbromide in tetrahydrofuran, followed by reduction with tri-tert-butoxyaluminum hydride in tetrahydrofuran, and treatment with potassium hydroxide in isopropanol to give 2β,3β-epoxy-5α-androst-6-en-17β - ol, M.P. 153–155° C., which is oxidized with complex of chromium trioxide and pyridine in pyridine to 2β,3β-epoxy-5α-androst-6-en-17-one, M.P. 141.5–143° C. and then transformed with methyl lithium in ether to 2β,3β-epoxy-17α-methyl-5α-androst-6-en-17β - ol, M.P. 221–222° C.

(2) Preparation of 2α,3α-epithio-5α-androst-6-en-17β-ol and 2α,3α-epithio-17α-methyl-5α-androst-6-en-17β-ol A stirred solution of 360 mg. of 3α-thiocyanato-5α-androst-6-ene-2β,17β-diol in a mixture of 3.5 ml. of dioxan and 3.5 ml. of methanol is mixed with a solution of 360 mg. of potassium carbonate in 1.5 ml. of water and the mixture is stirred for further 170 minutes at room temperature. The reaction mixture is diluted with water and extracted with methylene chloride. The extract solution is dried and evaporated. The residue is purified by thin-layer chromatography to afford 273 mg. of crystals of M.P. 135–136° C. Yield: 86.6%. $[\alpha]_D^{24}$ —61.5±1.0° (c.=1.011, chloroform)

IR: $\nu_{max.}^{Nujol}$ 3380, 3245, 3013, 1057, 967, 961, 745 cm.$^{-1}$

Analysis.—Calcd. for $C_{19}H_{28}OS$ (percent): C, 74.95; H, 9.27; S, 10.53. Found (percent): C, 74.48; H, 9.38; S, 10.28.

In a similar manner as above, 3α-thiocyanato-17α-methyl-5α-androst-6-ene-2β,17β-diol is treated with sodium hydroxide to obtain 2α,3α-epithio-17α-methyl-5α-androst-6-en-17β-ol, M.P. 185–186.5° C.

EXAMPLE 2

Preparation of 2α,3α-epithio-17α-methyl-5α-androst-6-en-17β-ol (i) Crystals of 2.80 g. of 2α,3α-epithio-5α-androst-6-en-17β-ol are added to pyridine chromium trioxide complex prepared from 2.5 g. of chromium trioxide and 30 ml. of pyridine, and the mixture is stirred for 6 hours at room temperature. The reaction mixture is diluted with iced water, filtrated to remove solid material, and extracted with ether. The organic layer is washed successively with diluted hydrochloric acid and aqueous sodium carbonate solution, dried over anhydrous sodium sulfate and evaporated to leave 2.55 g. of crystalline residue. Purification of the residue by chromatography over 250 g. of silica gel by solvent system of cyclohexane: ethyl acetate (2:1) gives 1.742 g. of 2α,3α-epithio-5α-androst-6-en-17-one. Yield: 62.1%. M.P. 152–154° C. $[\alpha]_D^{26.9}$ +12.4±0.5° (c.=1.029, chloroform).

Analysis.—Calcd. for $C_{19}H_{26}OS$ (percent): C, 75.45; H, 8.66; S, 10.60. Found (percent): C, 75.71; H, 8.66; S, 10.76.

(ii) A solution of 1.638 g. of 2α,3α-epithio-5α-androst-6-en-17-one in 25 ml. of tetrahydrofuran is added dropwise to a solution of methyl lithium prepared from 381 mg. of lithium in 20 ml. of ether and 5.7 g. of methyl iodide and the mixture is stirred for 3 hours. The reaction mixture is diluted with water and ammonium chloride, and extracted with methylene chloride. The extract solution is washed with aqueous sodium carbonate solution, dried over anhydrous sodium sulfate, and evaporated to dryness to leave 1.912 g. of crystalline residue. Purification of the residue by thin-layer chromatography gives 1.267 g. of 2α,3α-epithio-17α-methyl-5α-androst-6-en-17β-ol. Yield: 66.2% M.P. 185–187° C. $[\alpha]_D^{27.8}$ —84.4±1.6° (c.=0.775, chloroform).

IR: $\nu_{max.}^{Nujol}$ 3489, 3008, 1650, 934, 743, 677 cm.$^{-1}$

Analysis.—Calcd. for $C_{20}H_{30}OS$ (percent): C, 75.42; H, 9.49; S, 10.06. Found (percent): C, 75.75; H, 9.50; S, 9.95.

EXAMPLE 3

Preparation of 2α,3α-epithio-17α-ethynyl-5α-androst-6-en 17β-ol (i) A saturated solution of acetylene in a mixture of anhydrous ether and tetrahydrofuran (1:1) is mixed with a solution of potassium tert-amylate in tert-amyl alcohol prepared from 150 ml. of tert-amyl alcohol and 6.7 g. of potassium metal while bubbling with acetylene. To the mixed solution is added dropwise a solution of 7.012 g. of 2β,3β-epoxy-5α-androst-6-en-17-one in 220 ml. of a mixture of dry ether and tetrahydrofuran (1:1) and the mixture is stirred for 4 hours 45 minutes. The reaction mixture is diluted with 150 ml. of aqueous solution of 10% ammonium chloride and water and extracted with a mixture of ether and methylene chloride and ether. The extract solution is washed with saturated saline, dried over anhydrous sodium sulfate and evaporated to dryness. Recrystallization of the residue from acetone gives 6.465 g. of 2β,3β - epoxy - 17α - ethynyl-5α-androst-6-en-17β-ol.

Yield: 84.6%. M.P. 227–229° C. $[\alpha]_D^{27.1}$ −136.3±1.7° (c.=1.051, chloroform).

IR: $\nu_{max}^{Nujol}$ 3368, 3250, 1648, 1055, 870, 804, 748, 673 cm.$^{-1}$

*Analysis.*—Calcd. for $C_{21}H_{28}O_2$ (percent): C, 80.72; H, 9.03. Found (percent): C, 81.02; H, 9.07.

(ii) A solution of 5.736 g. of 2β,3β-epoxy-17α-ethynyl-5α-androst-6-en-17β-ol in 95 ml. of dry methylene chloride is mixed with a solution of thiocyanic acid in ether, which is prepared from 32 g. of potassium thiocyanate, 48 g. of phosphoric acid and 100 ml. of ether, and stirred for further 15 hours 10 minutes. The reaction mixture is diluted with 10% aqueous solution of sodium carbonate and extracted with methylene chloride. The extract solution is washed with water, dried over anhydrous sodium sulfate and evaporated to dryness. Recrystallization of the residue from a mixture of acetone and hexane gives 5.537 g. of 3α-thiocyanato-17α-ethynyl-5α-androst-6-ene-2β,17β - diol. Yield: 81.27%. M.P. 203.5–205.5° C. $[\alpha]_D^{26.8}$ −111.7±1.4° (c.=1.108, chloroform).

IR: $\nu_{max}^{Nujol}$ 3421, 3353, 3293, 2159, 1646, 1051, 759, 672 cm.$^{-1}$

*Analysis.*—Calcd. for $C_{22}H_{29}NO_2S$ (percent): C, 71.12; H, 7.87; N, 3.77; S, 8.63. Found (percent): C, 71.19; H, 7.87; N, 3.71; S, 8.63.

(iii) A solution of 5.413 g. of 3α-thiocyanato-17α-ethynyl-5α-androst-6-ene-2β,17β-diol in 80 ml. of dioxane is mixed with a solution of 5.45 g. of potassium carbonate in a mixture of 35 ml. of water and 70 ml. of methanol and the mixture is stirred for 4 hours 45 minutes at room temperature. The reaction mixture is concentrated under reduced pressure to remove dioxane and methanol, diluted with water and separated crystals are collected by filtration. The collected crystals are dried and recrystallized from a mixture of methylene chloride and methanol to give 3.312 g. of 2α,3α-epithio-17α-ethynyl-5α-androst-6-en-17β-ol. Treatment of the mother liquor afforded 967 mg. of the same compound. Total yield: 89.5%. M.P. 193–195° C. $[\alpha]_D^{28.1}$ −130.4±1.9° (c.=0.900, chloroform).

IR: $\nu_{max}^{Nujol}$ 3400, 3263, 3017, 1651, 1651, 1068, 750, 691 cm.$^{-1}$

*Analysis.*—Calcd. for $C_{21}H_{28}OS$ (percent): C, 76.78; H, 8.59; S, 9.76. Found (percent): C, 76.47; H, 8.59; S, 9.79.

EXAMPLE 4

Preparation of 2α,3α-epithio-5α-androst-6-en-17β-ol acetate

A solution of 197 mg. of 2α,3α-epithio-5α-androst-6-en-17β-ol in 5 ml. of pyridine is mixed with 0.5 ml. of acetic anhydride. After two nights, the reaction mixture is poured onto iced water and separated crystals are collected by filtration. The filtrate is extracted with methylene chloride. The extract solution is dried over anhydrous sodium sulfate and evaporated. Recrystallization of the residue from a mixture of methylene chloride and methanol gives 184 mg. of crystals of M.P. 151–152° C. Yield: 82.2%. $[\alpha]_D^{24}$ −63.3±1.0° (c.=1.030, chloroform).

IR: $\nu_{max}^{Nujol}$ 3003, 1731, 1251, 1241, 1045, 1032, 754, 693 cm.$^{-1}$; $\nu_{max}^{CS_2}$ 3002, 1738, 1243, 1043, 1028, 753, 691 cm.$^{-1}$

*Analysis.*—Calcd. for $C_{21}H_{30}O_2S$ (percent): C, 72.79; H, 8.73; S, 9.25. Found (percent): C, 72.96; H, 8.73; S, 9.24.

EXAMPLE 5

Preparation of 2α,3α-epithio-5α-androst-6-en-17β-ol propionate

A solution of 1.50 g. of 2α,3α-epithio-5α-androst-6-en-17β-ol in 10 ml. of pyridine is mixed with 3 ml. of propionic anhydride and the mixture is kept at room temperature overnight. The reaction mixture is diluted with iced water and separated crystals are collected by filtration and washed with water. The crystals are dissolved in methylene chloride and washed with water, dried over anhydrous sodium sulfate and evaporated to dryness. Recrystallization of the residue from a mixture of methylene chloride and methanol gives 1.535 g. of pure crystals. Yield: 86.5%. M.P. 140–142° C. $[\alpha]_D^{26.7}$ −60.6±0.9° (c.=1.055, chloroform).

IR: $\nu_{max}^{Nujol}$ 3007, 1738, 1647, 1189, 1031, 747, 699 cm.$^{-1}$

*Analysis.*—Calcd. for $C_{22}H_{32}O_2S$ (percent): C, 73.29; H, 8.95; S, 8.89. Found (percent): C, 73.32; H, 8.93; S, 8.82.

EXAMPLE 6

Preparation of 2α,3α-epithio-5α-androst-6-en-17β-ol enanthate

A solution of 1.5 g. of 2α,3α-epithio-5α-androst-6-en-17β-ol in 15 ml. of pyridine is mixed with 3.9 ml. of n-heptanoic anhydride and the mixture is kept at room temperature for two days. The reaction mixture is poured into iced water and extracted with ether. The ether extract is washed with diluted hydrochloric acid, aqueous sodium carbonate solution and water in order, dried over anhydrous sodium sulfate and evaporated to dryness. Purification of 1.872 g. of the residue by chromatography over 36 g. of alumina (Activity III, Standardized) gives 1.636 g. of the pure crystals from fraction eluted with petroleum ether and a mixture of petroleum ether and benzene (9:1) by recrystallization from a mixture of ether and methanol. Yield: 79.8%. M.P. 104–105° C. $[\alpha]_D^{28.7}$ −44.8±0.9° (c.=0.897, chloroform).

IR: $\nu_{max}^{Nujol}$ 3008, 1738, 1166, 745, 686 cm.$^{-1}$

*Analysis.*—Calcd. for $C_{26}H_{40}O_2S$ (percent): C, 74.95; H, 9.68; S, 7.70. Found (percent): C, 74.95; H, 9.66; S, 7.66.

EXAMPLE 7

Preparation of 2α,3α-epithio-5α-androst-6-en-17β-ol octanoate

A solution of 1.50 g. of 2α,3α-epithio-5α-androst-6-en-17β-ol in 15 ml. of pyridine is mixed with 4 ml. of octanoic anhydride and the mixture is kept at room temperature for two days. The reaction mixture is poured into iced water and extracted with ether. The ether extract is washed successively with diluted hydrochloric acid, aqueous sodium carbonate solution and water, dried over anhydrous sodium sulfate and evaporated to dryness. The residue is crystallized from methanol which is subjected to chromatography over 36 g. of alumina (Activity III, Standardized) to give 1.520 g. of pure crystals from 1.714 g. of fraction eluted with petroleum ether by recrystallization with a mixture of ether and methanol. Yield: 71.7%. M.P. 93.5–95.5° C, $[\alpha]_D^{27.8}$−42.0±0.9° (c.=0.930, chloroform).

IR: $\nu_{max}^{Nujol}$ 3008, 1736, 1651, 1177, 742, 689 cm.$^{-1}$

*Analysis.*—Calcd. for $C_{27}H_{42}O_2S$ (percent): C, 75.30; H, 9.83; S, 7.45. Found (percent): C, 75.28; H, 9.82; S, 7.53.

EXAMPLE 8

Preparation of 2α,3α-epithio-5α-androst-6-en-17β-ol decanoate

A solution of 1.50 g. of 2α,3α-epithio-5α-androst-6-en-17β-ol in 15 ml. of pyridine is mixed with 5.1 ml. of decanoic anhydride and the mixture is kept at room temperature for five days. The reaction mixture is poured into iced water and extracted with ether. The ether extract is washed with diluted hydrochloric acid, aqueous sodium carbonate solution and water, dried over anhydrous sodium sulfate and evaporated. The residue crystallizes by treatment with methanol which is subjected to purification with chromatography over 35 g. of alumina (Activity III, Standardized) to give 1.74 g. of pure crystals from fractions eluted with petroleum ether by recrystallization from a mixture of ether and methanol. Yield: 77.1%. M.P. 93.5–96° C. $[\alpha]_D^{27.8}$ −37.7±0.9° (c.=0.867, chloroform).

IR: $\nu_{max}^{Nujol}$ 3011, 1734, 1650, 1169, 744, 690 cm.$^{-1}$

Analysis.—Calcd. for $C_{29}H_{46}O_2S$ (percent): C, 75.93; H, 10.11; S, 6.99. Found (percent): C, 76.26; H, 10.16; S, 7.13.

EXAMPLE 9

Preparation of 2α,3α-epithio-5α-androst-6-en-17β-ol phenylpropionate and benzoate A solution of 1.50 g. of 2α,3α-epithio-5α-androst-6-en-17β-ol in 15 ml. of pyridine is mixed with 1.6 ml. of phenylpropionyl chloride and the mixture is kept at room temperature overnight. The reaction mixture is poured into iced water and extracted with a mixture of methylene chloride and ether. The extract solution is washed with diluted hydrochloric acid and aqueous sodium carbonate solution and water in order, dried over anhydrous sodium sulfate and evaporated. Purification of 2.9 g. of the residue by chromatography over 46 g. of alumina (Activity III, Standardized) affords 1.418 g. of pure crystals from fraction eluted with a mixture of petroleum ether and benzene (9:1 to 4:1). Yield: 66.1%. M.P. 147–149° C. $[\alpha]_D^{28.2}$ −28.7±0.7° (c.=0.990, chloroform).

IR: $\nu_{max}^{Nujol}$ 3008, 1729, 1645, 1645, 1605, 1583, 1498, 1184 745, 698 cm.$^{-1}$ Analysis.—Calcd. for $C_{28}H_{36}D_2S$ (percent): C, 77.02; H. 8.31; S, 7.34. Found (percent): C, 77.14; H, 8.29; S, 7.35.

In a similar manner, 2α,3α-epithio-5α-androst-6-en-17β-ol is treated with benzoyl chloride in pyridine to give benzoate.

EXAMPLE 10

Preparation of 2α,3α-epithio-17β-(1-methoxycyclopentyl)oxy-5α-androst-6-ene

A suspension of 100 mg. of 2α,3α-epithio-5α-androst-6-en-17β-ol in 10 ml. dichloromethane has added thereto 0.7 ml. of 1,1-dimethoxycyclopentane and 3 mg. of pyridine salt of toluene-p-sulfonic acid. The mixture is warmed for 4 hours on a water bath of 50° C. with azeotropic distillation. After the addition of two drops of pyridine to the reaction mixture, the latter is evaporated under reduced pressure. Purification of the residue by chromatography over alumina gives pure 2α,3α-epithio-17β-(1-methoxycyclopentyl)oxy - 5α - androst - 6 - ene. M.P. 116–119° C. $[\alpha]_D^{23}$ +50.3±0.9 (c.=0.978, chloroform).

IR: $\nu_{max}^{Nujol}$ 3027, 1239, 1200, 1114, 1105, 1052, 745 cm.$^{-1}$

Anal.—Calcd. for $C_{25}H_{38}O_2S$ (percent): C, 74.58; H, 9.51; S, 7.96. Found (percent): C, 74.74; H, 9.46; S, 7.88.

What we claim is:

1. A compound of the formula:

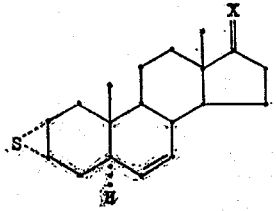

wherein X represents an oxo group or

group, in which R represents a hydrogen atom or an optionally substituted lower hydrocarbon-carboxylic acyl group or a substituted or unsubstituted cyclo-lower hydrocarbon group or tetrahydropyranyl group or tetrahydrofuranyl group; R′ represents a hydrogen atom or a lower hydrocarbon group.

2. A compound according to claim 1, wherein X is an oxo group, namely 2α,3α-epithio-5α-androst-6-en-17-one.

3. A compound according to claim 1, wherein X is a

group, namely 2α,3α-epithio-5α-androst-6-en-17β-ol.

4. A compound according to claim 1, wherein X is a

group in which R is a lower alkanoyl group, namely 2α,3α-epithio-5α-androst-6-en-17β-ol lower alkanoate.

5. A compound according to claim 4, wherein R is an acetyl group, namely 2α,3α-epithio-5α-androst-6-en-17β-ol acetate.

6. A compound according to claim 4, wherein R is a propionyl group, namely 2α,3α-epithio-5α-androst-6-en-17β-ol propionate.

7. A compound according to claim 4, wherein R is an n-heptanoyl group, namely 2α,3α-epithio-5α-androst-6-en-17β-ol enanthate.

8. A compound according to claim 4, wherein R is an n-octanoyl group, namely 2α,3α-epithio-5α-androst-6-en-17β-ol octanoate.

9. A compound according to claim 4, wherein R is a decanoyl group, namely 2α,3α-epithio-5α-androst-6-en-17β-ol decanoate.

10. A compound according to claim 1, wherein X is a

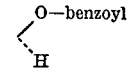

group, namely, 2α,3α-epithio-5α-androst-6 - en - 17β - ol benzoate.

11. A compound according to claim 1, wherein X is a

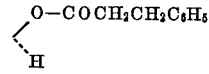

group, namely 2α,3α-epithio-5α-androst-6-en-17β-ol phenylpropionate.

12. A compound according to claim 1, wherein X is a

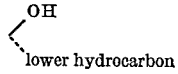

group, namely 2α,3α-epithio-17α-lower hydrocarbon substituted-5α-androst-6-en-17β-ol.

13. A compound according to claim 12, wherein the hydrocarbon group is a methyl group, namely 2α,3α-epithio-17α-methyl-5α-androst-6-en-17β-ol.

14. A compound according to claim 12, wherein the hydrocarbon group is an ethynyl group, namely 2α,3α-epithio-17α-ethynyl-5α-androst-6-en-17β-ol.

15. A compound according to claim 1, wherein X is a

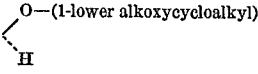

group, namely 2α,3α-epithio-17β-(1-lower alkoxycycloalkyl)oxy-5α-androst-6-ene.

16. A compound according to claim 15, wherein the lower alkoxycycloalkyl group is a 1-methoxycyclopentyl group, namely 2α,3α-epithio-17β-(1-methoxycyclopentyl) oxy-5α-androst-6-ene.

17. A compound of the formula

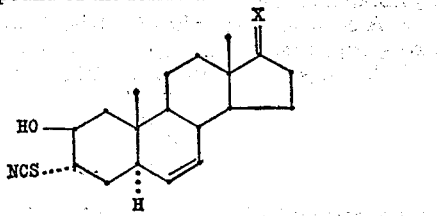

wherein X represents the same significances as defined above.

18. A compound according to claim 17, wherein X is a

group, namely 3α-thiocyanato-5α-androst-6-ene - 2β,17β-diol.

19. A compound according to claim 17, wherein X is a

group, namely 3α-thiocyanato-17α-methyl-5α-androst-6-ene-2β,17β-diol.

20. A compound according to claim 17, wherein X is a

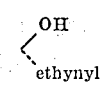

group, namely 3α-thiocyanato-17α-ethynyl-5α-androst-6-ene-2β,17β-diol.

References Cited
UNITED STATES PATENTS

| | | | |
|---|---|---|---|
| 3,230,215 | 1/1966 | Komeno | 260—239.5 |
| 3,290,294 | 12/1966 | Komeno | 260—239.5 |
| 3,301,850 | 1/1967 | Klimstra | 260—239.5 |
| 3,405,124 | 10/1968 | Kimstra | 260—239.5 |
| 3,519,715 | 7/1970 | Nagata et al. | 424—241 |

LEWIS GOTTS, Primary Examiner

E. G. LOVE, Assistant Examiner

U.S. Cl. X.R.

260—239.55 R, 397.4, 397.5; 424—241